(12) United States Patent
Davies et al.

(10) Patent No.: US 10,180,500 B2
(45) Date of Patent: Jan. 15, 2019

(54) SIGNAL PROCESSING

(71) Applicant: QINETIQ LIMITED, Farnborough, Hampshire (GB)

(72) Inventors: Nigel Clement Davies, Colwall (GB); Richard Edward Bowden, Malvern (GB); Mark Dumville, Nottingham (GB); Ben Peter Wales, Nottingham (GB); Luis Enrique Aguado, Leeds (GB); Thomas Andrew Evans, Kidderminster (GB)

(73) Assignee: QINETIQ LIMITED, Farnborough (GB)

( * ) Notice: Subject to any disclaimer, the term of this patent is extended or adjusted under 35 U.S.C. 154(b) by 452 days.

(21) Appl. No.: 14/899,459

(22) PCT Filed: Jun. 27, 2014

(86) PCT No.: PCT/EP2014/063743
§ 371 (c)(1),
(2) Date: Dec. 17, 2015

(87) PCT Pub. No.: WO2014/207223
PCT Pub. Date: Dec. 31, 2014

(65) Prior Publication Data
US 2016/0146947 A1 May 26, 2016

(30) Foreign Application Priority Data

Jun. 27, 2013 (GB) .................................. 1311571.2

(51) Int. Cl.
*G01S 19/32* (2010.01)
*G01S 19/05* (2010.01)
(Continued)

(52) U.S. Cl.
CPC .............. *G01S 19/32* (2013.01); *G01S 19/09* (2013.01); *G01S 19/215* (2013.01); *G01S 19/05* (2013.01); *H04B 7/18523* (2013.01)

(58) Field of Classification Search
CPC ........ G01S 19/215; G01S 19/32; G01S 19/05; G01S 19/09; H04B 1/707; H04B 7/18523
See application file for complete search history.

(56) References Cited

U.S. PATENT DOCUMENTS

| | | | |
|---|---|---|---|
| 5,379,224 A | 1/1995 | Brown et al. | |
| 5,825,887 A | 10/1998 | Lennen | |

(Continued)

FOREIGN PATENT DOCUMENTS

| | | |
|---|---|---|
| JP | 2006-513084 A | 4/2006 |
| JP | 2009-150691 A | 7/2009 |

(Continued)

OTHER PUBLICATIONS

Sep. 12, 2014 Search Report issued in International Patent Application No. PCT/EP2014/063743.

(Continued)

*Primary Examiner* — Olumide Ajibade Akonai
(74) *Attorney, Agent, or Firm* — Oliff PLC

(57) ABSTRACT

A method of processing signal data including an unencrypted portion and an encrypted portion, the method including: receiving, at a receiver, the signal data; processing a sample of the signal data to provide a processed signal sample including data relating to the encrypted portion of the signal data and data relating to the unencrypted portion of the signal data, comparing the unencrypted signal data with at least one reference signal to determine information including at least one of (i) the time at which the signal was sent from the source and (ii) the identity of the source; requesting, based on the determined information, and from (Continued)

a source remote to the receiver, a set of encrypted reference signal samples; comparing, on a processing device remote to the receiver, the set of encrypted reference signal samples with the received encrypted signal data to identify any matching signal samples.

20 Claims, 8 Drawing Sheets

(51) Int. Cl.
*G01S 19/21* (2010.01)
*G01S 19/09* (2010.01)
*H04B 7/185* (2006.01)

(56) References Cited

U.S. PATENT DOCUMENTS

| | | | | |
|---|---|---|---|---|
| 6,377,892 | B1* | 4/2002 | Johnson | G01C 21/00 |
| | | | | 342/357.31 |
| 7,978,130 | B1* | 7/2011 | Cohen | G01S 19/43 |
| | | | | 342/357.56 |
| 9,876,529 | B2* | 1/2018 | Turner | H04B 1/707 |
| 2005/0038601 | A1 | 2/2005 | Dentinger et al. | |
| 2010/0150284 | A1 | 6/2010 | Fielder et al. | |
| 2012/0121087 | A1 | 5/2012 | Psiaki | |
| 2013/0293415 | A1* | 11/2013 | Gutt | G01S 19/40 |
| | | | | 342/357.25 |

FOREIGN PATENT DOCUMENTS

| | | |
|---|---|---|
| JP | 2011-27468 A | 2/2011 |
| RU | 2385470 C1 | 3/2010 |
| WO | 2007/099195 A1 | 9/2007 |
| WO | 2012/007720 | 1/2012 |

OTHER PUBLICATIONS

Sep. 12, 2014 Written Opinion issued in International Patent Application No. PCT/EP2014/063743.

Nov. 27, 2013 Partial Search Report issued in British Patent Application No. GB1311571.2.

Lo, Sherman et al., "Signal authentication—A sercure civil GNSS for today," Sep. 1, 2009, XP055027133, pp. 32-37.

May 18, 2018 Office Action with Search Report issued in Russian Application No. 2016102324/08(003337).

* cited by examiner

SIGNAL PROCESSING

FIELD OF THE INVENTION

The present invention relates to apparatus, methods, and programs for a computer for signal processing and systems incorporating the same. In particular, but not exclusively, it relates to the development of a positioning system of enhanced robustness against intentional and un-intentional threats using encrypted navigation signals in general and in particular Galileo PRS signals.

BACKGROUND TO THE INVENTION

Satellite navigation systems such as the Global Positioning System (GPS), Glonass, Galileo, and BeiDou are used to provide position, velocity and timing information to a diverse range of applications. Satellite navigation systems work by broadcasting timing signals to users equipped with receiver devices.

Conventional receiver devices include a module that internally generates signals matching those broadcast by the satellites, referenced to an internal clock. These signals are in a defined format and are specified in open literature for each system. The receiver correlates these internal 'replica' signals with the received satellite signals to extract the correct signal timing and carrier phase and frequency for each satellite. The receiver also decodes the information contained within the satellite broadcast message that enables the receiver to know the location of each satellite.

The receiver uses the results of the correlation process to determine the time of flight for the received signals from each satellite. The time of flight is combined with the information of the location of several satellites in a mathematical process to calculate the position of the receiver antenna.

In addition to supporting an expanding range of commercial applications, satellite navigation systems are used in the field of security and defence. Whereas in the commercial domain, unencrypted, or Open Service, signals are used to obtain the position of the receiver, within the security and defence domain, secure encrypted signals are used. In the Galileo system, this is known as the Public Regulated Service, or PRS, and other systems provide similar services. The secure signals are also broadcast in a predefined format; however such formats are not public information. The satellite system is responsible for encrypting the signals, and the signals are decoded by a specialised secure receiver device.

In a known secure receiver, this is achieved through the use of a security module or security function. The security module is usually a physical component of the receiver. The security module/function contains and processes the cryptographic algorithms that enable the secure signal to be used by the receiver. The security module is capable of generating the required information to receive and process the encrypted signal as well as decoding the encrypted broadcast message that contains information on satellite orbits and clocks and other system and security information. Each receiver requires its own security module/function.

Such security modules will only operate if they have valid cryptographic keys and other parameters/information which are required to unlock the process of decoding the encrypted signals. The keys need to be loaded into the receiver. This process can be done manually (using specific equipment) or autonomously using techniques known as 'over-the-air'. The keys and cryptographic material are critical to the security of the satellite navigation system and therefore there is a need to protect the distribution and management of the material. This can impose a large overhead on the operation of receivers that use encrypted navigation signals.

WO/2012/007720, in the name of Thales, describes a user receiver which includes a capability to capture samples of wideband signals including the Galileo Open Service and the encrypted Public Regulated Service (PRS). The user receiver includes a processing module that can process Open Service signals which are used to compute the position, velocity and time (also called 'PVT' information) of the user as described above. The Open Service PVT information is transmitted with the captured wideband samples to a central server. The central server has access to the secure PRS information which it uses to process the PRS elements of the captured signal. The server uses the PRS information to separately compute the PVT of the user. In this way, the number of PRS security modules which hold the secure cryptographic information can be reduced as it is not a requirement to include a security module in each receiver. The central server compares the Open Service PVT with the server computed PRS PVT and uses the information to carry out an authentication process.

However, this method relies on communicating large volumes of wideband RF captured signal. This has limitations in terms of available communications bandwidth, power required to broadcast the PRS signals samples and the cost of communications. In addition, it requires an Open Service receiver to operate at the user side. In many instances, the user does not require knowledge of his/her position (for example this location information may be provided to a third party, and used as an emergency beacon, or to provide information of how a vehicle is being driven, or the like). To operate an Open Service receiver unnecessarily places additional load on the battery at the user side. Further, the methods and apparatus described rely on the broadcast of open service PVT, and this signal can be intercepted, interfered with or deliberately jammed (which is one of the reasons for the existence of separate encrypted signals).

The NAVSYS Corporation have proposed a low cost GPS sensor, known as the TIDGET, described in U.S. Pat. No. 5,379,224, which utilises a distributed GPS software receiver concept. The TIDGET sensor does not track the GPS signals, but instead captures a "snapshot" of raw GPS samples which are communicated to the central server. At the server, the samples are processed to determine the user's PVT information. A related paper entitled 'PPS Positioning in Weak Signal GPS Environments using a TIDGET Sensor' (Proceedings of ION GNSS 2010, Portland, Oreg., September 2010) describes how the TIDGET concept could be applied to GPS military signals by using the field unit to capture the raw Radio Frequency (RF) data which is communicated to a central server for direct injection into a conventional GPS Precise Positioning Service (PPS) hardware receiver.

SUMMARY OF THE INVENTION

According to a first aspect of the present invention there is provided a method of processing a signal data comprising an unencrypted portion and an encrypted portion, the method comprising:
 (i) receiving, at a receiver, the signal data;
 (ii) processing a sample of the signal data to provide a processed signal sample comprising data relating to the encrypted portion of the signal data and data relating to the unencrypted portion of the signal data, (iii) comparing the unencrypted signal data with at least one reference signal to determine information comprising at least one of (i) the time at which the signal was sent from the source and (ii) the identity of the source;

(iv) requesting, based on the determined information, and from a source remote to the receiver, a set of encrypted reference signal samples;

(v) comparing, on a processing device remote to the receiver, the set of encrypted reference signal samples with the received encrypted signal data to identify any matching signal samples.

In one example, the method is a method of authenticating a source of the signal data and/or the content of a signal, and the signal source is authenticated in the event of at least one match between the set of encrypted reference signal samples and the received encrypted signal sample being determined.

Alternatively or additionally, the method is a method of identifying an encrypted data signal, and the method further comprises deriving data based on the identification of matching encrypted signal sample(s) to determine information encoded in the encrypted data signal. In such examples, as only encrypted reference samples based on the determined information are compared to a received signal sample, candidate samples for comparison may be determined rapidly.

Such methods may have particular application to Global Navigation Satellite Systems (GNSS). In such examples, there may be many distributed and moveable receivers (e.g. vehicle based navigation aids, safety beacons, cellular telephones, etc.). As will be familiar to the skilled person, such receivers often perform tracking using processing circuitry contained therein, but in the above described method, the functionality of a tracking receiver maybe distributed between a field receiver and a remote processing device (e.g. a central sever). GNSS services usually incorporate an encrypted portion (e.g. Public Regulated Service (PRS) in Galileo, PPS in GPS) and an open, unencrypted portion. In one method as set out above, encrypted navigation signals can be used to authenticate the measurements obtained from open, unencrypted, signals and/or to directly provide a robust position and time data for the receiver without the need for distributing navigation encryption keys to the field receiver units.

In a preferred example, the method is carried out by at least three entities: a receiver, a remote processing device such as a central server, and a security module, which preferably holds a key enabling it to generate the encrypted receiver signal sample. In one example, steps (i) and (ii) are carried out by the receiver, and the processed signal sample is then transmitted to the remote processing device for further processing. However, in other examples, step (iii) may also be performed by the receiver, and the determined information may be, or form part of, the data relating to the unencrypted signal data portion which in turn forms part of the processed signal sample (in which case, step (iii) is carried out before, or concurrently with, step (ii)).

The remote processing device may use the received information to request a set of encrypted reference signals from the security module. The security module may also receive the processed signal sample, or at least the part there of which relates to the encrypted portion of the signal data received at the receiver, and then perform step (v). This may help improve the security of the system as a whole. However, the set of encrypted reference signals generated may be transmitted from the security module to the remote processing device, which may perform step (v).

Such methods addresses limitations of GNSS techniques proposed to date for robust, accurate positioning, which usually requires keys for encrypted signals to be distributed to field receiver units. As will be appreciated by the skilled person, the distribution of keys is burdensome, particularly as it must be achieved in a secure manner. Further, the option of partitioning of the core functionalities of a GNSS receiver between the receiver and other processing devices such as central server saves on the processing circuitry and battery power required by the receiver (which may also allow the receiver to be smaller), or else may increase processing speed, signal detection, or the like.

The method may also reduce so called 'time-to-fix' (TTF) (i.e. the time taken to identify the satellite source of a signal) as only a subset of the possible encrypted reference samples are selected for comparison, with the determined information being used to select the subset. Although the particular application of the method to GNSS has been set out above, the method could also be used in terrestrial navigation and location systems (e.g. pseudolites, radio-navigation, radio-positioning systems and use of signals of opportunity for positioning). It may also have application outside the field of navigation, and could be used for clock signals, or indeed any data signals.

In preferred embodiments of the present invention, the step of processing the signal sample is arranged to reduce the signal sample size prior to transmitting the signal sample. This is advantageous as it reduces the bandwidth required to transmit the signal, which may in turn reduce communications costs (communications bandwidth occupied and potentially therefore data charges) and/or allow for a higher volume of signals to be sent.

In a particularly preferred embodiment, the signal is reduced such that it represents the minimum, or substantially the minimum, amount of data to ensure successful processing of the encrypted signal data. Of course, in practical terms, bandwidth reduction models employed (and performance compromises acceptable for a specific application) will result different amounts of data for transmission, which may be larger than the technical minimum, but preferably is (or approaches) the greatest reduction appropriate in the circumstance.

Such methods may comprise one or more of the following: signal down-conversion, filtering of analogue or digital signals into separate unencrypted and encrypted streams for processing, reduction of the data sample, filtering to preserve only a subsection of the full signal band, for example including one or more than one spectral lobes.

In examples which separate the unencrypted and encrypted signals into two streams for processing, the two streams may be subsequently translated, re-sampled and summed together, for example prior to performing other sample reduction processing.

In other examples, which separate the unencrypted and encrypted signals into two narrowband streams for data compression, the two streams may be subsequently translated in frequency, combined together into a single narrowband stream and re-sampled. All the signals in the two streams may be spread with different Pseudo Random Number (PRN) sequences, therefore preserving a low level of cross-correlation. Optionally this may be done only when it is known that there is no interference in either signal band. This method can be combined with other data reduction processing.

As the skilled person will be aware, such processes will increase in signal noise but both unencrypted and encrypted signal data could be present in the same processed signal sample data packet, and could be extracted and recovered prior to the steps of comparing the signals.

In an embodiment where the encrypted data is used to authenticate the unencrypted data, it may be possible to accept a signal power loss in the encrypted signals (e.g. using just a single side lobe in a BOC modulated signal) since the acquisition is performed on the unencrypted signal and a limited search for authentication purposes in the encrypted signal.

The method may alternatively or additionally comprise pre-screening the signal received prior to transmission to the processing device. In some examples, the method may be interrupted if the signal does not meet predetermined criteria.

Such pre-screening of the signal captured may check the signal quality and/or detect the presence of high levels of interference, unwanted or counterfeit signals. Such pre-screening may comprise statistical analysis of the automatic gain control operation (AGC), the analogue-to-digital conversion levels, the captured signals spectrum, the signal auto-correlation properties or multi-antenna spatial filtering and spatial signal analysis, or the like. Note, such screening is referred to herein as 'pre-screening' as additional screening of the data captured may be performed on the information determined at the processing device from the unencrypted data portion, for example based on the detected signal strength levels and successful acquisition criteria. In some examples, if the pre-screening indicates that the captured signal does not meet predetermined standards, the method may further comprise one or more of: (i) restarting the method by recapturing a signal, (ii) a user notification being generated, (iii) adapting the capture parameters, (iv) employing anti-interference techniques or (v) aborting signal capture.

In a preferred embodiment, pre-screening may be used to determine the amount of signal that is required to be captured and/or included in the processed signal sample to ensure that there is sufficient data in the processed signal sample to allow the comparison step of the encrypted signal to be carried out, and may therefore provide an input to the signal reduction step. In such examples, 'good' signal(s) may allow a smaller processed signal to be formed.

The method may further comprise encrypting and/or cryptographically signing at least part of the processed signal prior to transmission to the remote processing device. In such examples, the method may further comprise decrypting the signal at the remote processing device. This increases the security of the method.

The proposed approach can make use of encryption to ensure that unencrypted signal data sent from a user to the remote processing device is secured, guarding against security compromise from use the technique and ensuring that the location of the user remains protected.

In some examples, the step of, at the remote processing device, comparing the received unencrypted signal sample with at least one reference signal to determine information from the unencrypted signal portion may comprise determining at least one of the position and velocity of the receiver. This is advantageous as the data may be readily utilised either immediately or following, if carried out, an authentication step.

The step of comparing the signal samples with reference samples may comprise correlation. Such methods will be familiar to the skilled person.

Once at least one matching encrypted data sample has been determined, the unencrypted signal sample(s) associated with an unmatched encrypted data sample(s) may be excluded and only matched (i.e. authenticated) signal samples may be utilised in further processing of the data.

In some examples, the matched encrypted signal samples may be decrypted/decoded to determine the content of the signals. In the context of navigation systems, this could comprise determining position, velocity and/or time data for the receiver at the time the signal was received.

The method may further comprise storing any data determined from the signal samples and/or sending data determined therefrom to the receiver. This allows the user of the receiver to know their position, which may be advantageous in some embodiments.

According to a second aspect of the present invention there is provided apparatus for processing signal data comprising an unencrypted portion and an encrypted portion, the apparatus comprising at least one of each of the following: a receiver, a remote processing device and a security module, wherein:

(i) the security module comprises a reference signal generator arranged to generate a set of encrypted reference signal samples;

(ii) the receiver is arranged to receive signal data and comprises processing circuitry arranged to process the signal data to provide a processed signal sample comprising data relating to the encrypted portion of the received signal data and data relating to the unencrypted portion of the received signal data, and further comprises a transmitter for transmitting the processed signal sample to the remote processing device;

(iii) at least one of the remote processing device and the receiver comprises processing circuitry comprising a comparison module for comparing the signal data with reference signal samples, and arranged to compare received unencrypted signal data with at least one reference signal to determine information comprising at least at least one of (i) the time at which the signal data was sent from the source and (ii) the identity of the source;

(iv) the remote processing device comprises communication apparatus arranged to request generation of encrypted reference signal samples based on the determined information;

(v) the security module is arranged to generate, based on the request, a set of encrypted reference signal samples; and (vi) at least one of the security module and the remote processing device comprises a comparison module arranged to compare the set of encrypted reference signal samples with the received encrypted signal data to identify any matching signal samples.

In one example, the apparatus is arranged to authenticate a source of signal data and/or content thereof, and the signal source/data is authenticated in the event of a match between the set of encrypted reference signal samples and the received encrypted signal sample. In such examples, the remote processing device may comprise an authentication module, arranged to authenticate information output from the comparison module in relation to an unencrypted signal based on the determination that a related encrypted signal portion matches a reference sample.

Alternatively or additionally, the apparatus is arranged to identify an encrypted data signal, and the apparatus is arranged to derive data based on the identification of matching encrypted signal sample(s) to determine information encoded in the encrypted data signal. In such examples, as only the set of encrypted reference samples generated based on the determined information are compared to the received signal sample, the candidate samples for decryption may be determined relatively rapidly. Further, additional data (such as receiver sensor data, providing information about the movement of the receiver or further positional information sources) may be used to further constrain the set of encrypted reference samples requested from the security module. In such examples, the receiver may further comprise one or more sensors (e.g. speedometers, accelerometers, altimeters, compasses, cellular telephone receiver apparatus and the like), and the sensor information may be sent to the remote processing device, either as part of the processed signal sample or separately.

Such apparatus may be part of a Global Navigation Satellite System (GNSS), and the receiver may be a GNSS receiver which may be hand held, mounted in a vehicle, incorporated in a mobile phone or other mobile computing device, or the like. In such examples (and for use with other systems such as other terrestrial navigation and location systems (e.g. pseudolites, radio-navigation, radio-positioning systems and use of signals of opportunity for positioning)), there may therefore be many distributed and moveable receivers.

In preferred embodiments of the present invention, the processing circuitry of the receiver comprises a compression module arranged to reduce the signal sample size prior to transmitting the signal sample. Note that the term 'compression' as used herein is used in a broad sense of reducing the signal bandwidth and/or the number of bits. The compression may be lossy, and may comprise one or more of the following: signal down-conversion, filtering of analogue or digital signals into separate unencrypted and encrypted streams for processing, reduction of the data sample, filtering to preserve only a subsection of the full signal band, for example including one or more than one spectral lobes, or any other compression method which is familiar to the person skilled in the art.

This is advantageous as it reduces the bandwidth required to transmit the signal, which may in turn reduce communications costs and/or allows for a higher volume of signals to be sent. The compression module may be arranged to minimise the data substantially as far as possible, while ensuring that sufficient data is retained to allow successful processing of the encrypted signal data.

In some examples, the receiver may further comprise a screening module, arranged to pre-screen the signal received prior to transmission to the remote processing device.

Such pre-screening of the signal captured may check the signal quality and/or detect presence of high levels of RF interference, unwanted or counterfeit signals. Such pre-screening may comprise statistical analysis of the automatic gain control operation (AGC), the analogue-to-digital conversion levels, the captured signals spectrum, the signal auto-correlation properties or multi-antenna spatial filtering and spatial signal analysis, or the like.

The screening module may provide an input to the compression module. For example, the result of the screening process may be used to determine the amount of signal that is required to be captured and processed to ensure that there is sufficient data in the processed signal sample to allow the comparison step of the unencrypted and/or encrypted signal to be carried out.

The receiver may further comprise an encryption module, arranged to encrypt and/or cryptographically sign at least part of the processed signal prior to transmission to the processing device. In such examples, the remote processing device may comprise a decryption module. Further, the receiver may comprise an analogue to digital converter, arranged to digitise the received signal. A digitised signal will be readily processed.

In some examples, the receiver may comprise a comparison module, arranged to compare received unencrypted data samples with 'locally' generated reference samples (i.e. generated by the processing circuitry of the receiver). In such examples, the receiver may be arranged to operate as a conventional 'open service' GNSS receiver and may use the comparison to determine data such as positional data, which could be displayed to a user and/or could form part of the processed data signal sent for remote processing. The user could then benefit from an authentication of this data following remote processing of the data, without actually having access to a key to use the encrypted service itself. However, in other examples, e.g. where the data is to be used for tracking the position of the receiver device, and/or there is a desire to minimise the processing/battery requirements of the receiver unit, most or all substantial GNSS processing steps (e.g. acquisition and the like) could be carried out at the remote processing device.

Therefore, in other examples, a comparison module is provided at the remote processing device and is arranged to compare the received signal samples with at least one reference signal to determine information from the signal sample. To that end, the remote processing device may further comprise a reference signal generator.

The determined information can be used to determine a set of signal samples to match with the encrypted data samples. The information may additionally comprise at least one of the position or velocity of the receiver.

Once at least one matching encrypted data sample has been determined, the unencrypted signal sample(s) associated with an unmatched encrypted data sample(s) may be excluded such that only signal samples which have been authenticated by the authentication module are utilised in further processing of the data.

In some examples, the matched encrypted signal samples may be decrypted and/or decoded to determine the content of the signals. In the context of navigation systems, this could comprise determining position, velocity and/or time data for the receiver at the time the signal was received. The security module may therefore comprise at least one of a decryption module and a data content module, arranged to identify the content the signal (in the example of GNSS, this will usually be by reference to the data used to generate the matching encrypting signal, which can therefore be associated with the original signal received at the receiver. However, in other examples (and in some instances in GNSS as well), the data may be accessed by decrypting and decoding the signal or reference signal itself).

In order to communicate with one another, each, some or all of the receiver, remote processing device and the security module may further comprise communications module(s).

In one embodiment, a received signal is captured for processing at a time determined by processing circuitry, and time at which the signal is captured is varied. In particular, the time may be varied in a manner which is not publically known (and preferably not easily determined). The time may be varied in deterministic manner, for example as determined by a pseudorandom number generator (PRNG). The PRNG may operate according to a seed, which is shared by the remote processing device. However the time may be determined in another way, so long as the remote processing device can also derive the correct time of sampling to verify that the data has been collected at the appropriate time (for example, there may a predetermined sequence which is known to both devices, or the like). This could be advantageous as it means that an attempt to spoof the receiving apparatus (i.e. to pretend to a remote processing device to be a particular receiving apparatus, for example so as to mislead the remote processing device as to the true position of the receiver), may be thwarted if it is determined that a signal has been gathered at the wrong time.

In some examples, at least the time data component of the processed signal relating to the time of capture is cryptographically signed and/or encrypted. This is advantageous as it prevents, if the signal is captured in transmission, use of the time data to prepare a plausible, but misleading, replacement processed signal.

Each of the modules mentioned above may be embodied in hardware, software, firmware or the like, and may be distributed into one or more physical entities. Indeed, the security module may form part of the remote processing device, but it will be appreciated that the content thereof is preferably kept secure, using physical and/or technological security means. For example, it may be arranged in a tamper-proof enclosure, or such that, should the enclosure be breached, data held thereon will be clear. Other methods/apparatus will be familiar to the skilled person.

According to a third aspect of the present invention there is provided apparatus for receiving a signal comprising an unencrypted portion and an encrypted portion, the receiver being arranged to receive the signal and comprising processing circuitry arranged to process the signal to provide a processed signal sample comprising data relating to the encrypted portion of the signal and data relating to the unencrypted portion of the signal, wherein the processed signal sample is compressed relative to the received signal size, and further comprises a transmitter for transmitting the processed signal sample to the remote processing device.

Compression methods may, for example, comprise signal down-conversion, filtering of analogue or digital signals into separate unencrypted and encrypted streams for processing, reduction of the data sample, filtering to preserve only a subsection of the full signal band, for example including one or more than one spectral lobes. Other methods of data compression/reduction will be familiar to the skilled person and/or are described above.

In one embodiment, a received signal is captured for processing at a time determined by processing circuitry, and the time at which the signal is captured is varied. In particular, the time may be varied in a manner which is not publically known (and preferably not easily determined). The time may be varied in deterministic manner, for example as determined by a pseudorandom number generator. This could be advantageous as it means that an attempt to spoof the receiving apparatus (i.e. to pretend to a remote device to be a particular receiving apparatus, for example so as to mislead the remote device as to the true position of the receiver), may be thwarted if it is determined that a signal has been gathered at the wrong time.

The receiver may have any of the features of the receiver described in relation to the second aspect of the invention and/or may be arranged to carry out the steps of the method of the first aspect of the invention which are carried out by the receiver.

According to a fourth aspect of the present invention there is provided apparatus for processing a signal sample comprising an unencrypted portion and an encrypted portion, the apparatus comprising a remote processing device and a security module wherein:

(i) the security module comprises a signal generator arranged to generate a set of encrypted reference signal samples;

(ii) remote processing device comprises processing circuitry arranged to receive the signal sample comprising data relating to the encrypted portion of the signal and data relating to the unencrypted portion of the signal, and to determine therefrom at least one of (i) the time at which the signal was sent from the source and (ii) the identity of the source; and communication apparatus arranged to request encrypted reference signal samples;

(iii) the security module is arranged to generate, based on the determined information, a set of encrypted reference signal samples; and (iv) at least one of the remote processing device and the security module comprises a comparison module, the comparison module being arranged to compare the set of encrypted reference signal samples with the received encrypted signal data to identify any matching signal samples.

In one example, the remote processing device comprises a or the comparison module for comparing the received data reference signal samples, and arranged to compare received unencrypted signal data with at least one reference signal to determine information comprising at least one of (i) the time at which the signal was sent from the source and (ii) the identity of the source. However, in other examples, this information may be provided as part of the received data.

The remote processing device and the security module may have any of the features of the remote processing device/security module described in relation to the second aspect of the invention and/or may be arranged to carry out the steps of the method of the first aspect of the invention which are carried out by the remote processing device/security module as appropriate.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
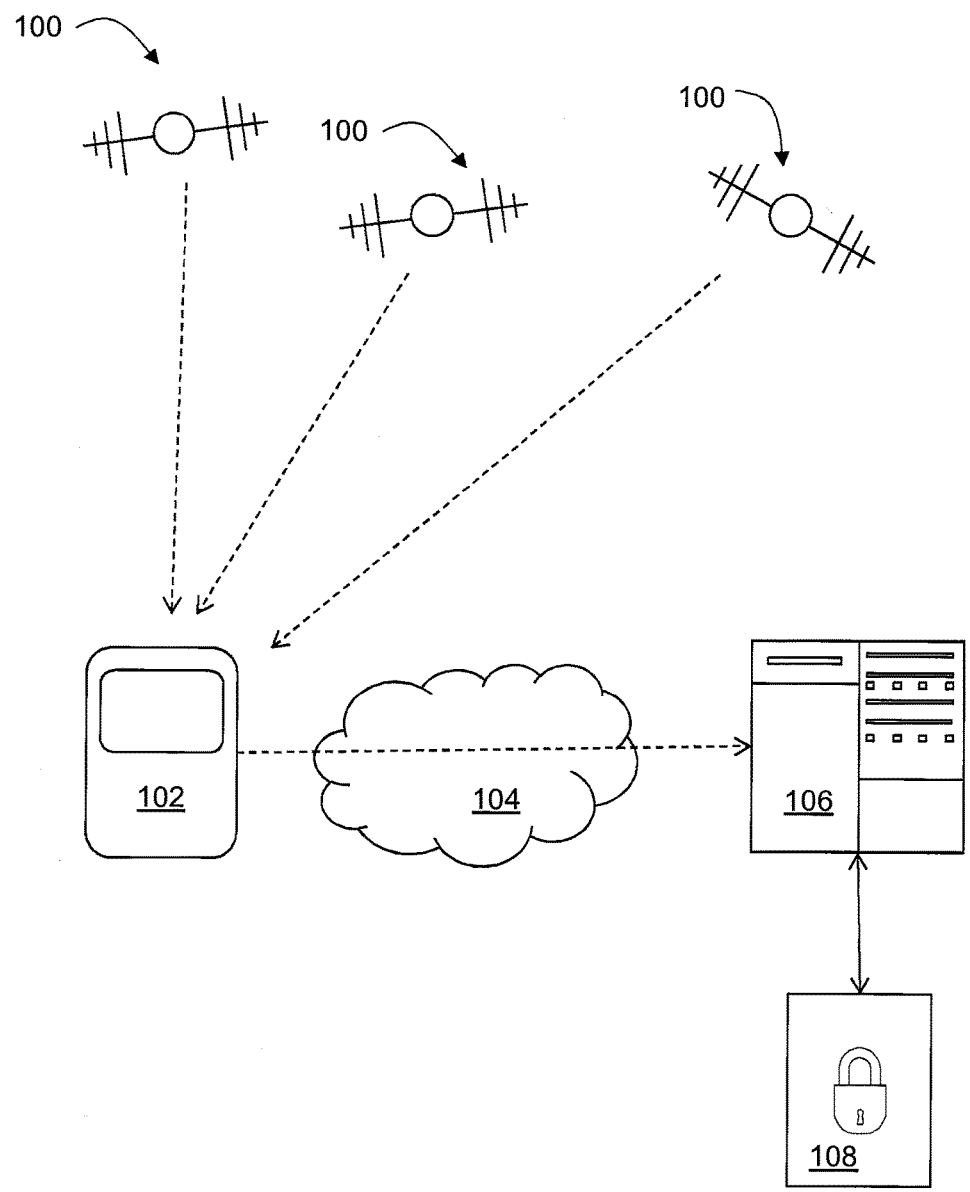
FIG. 1 shows an overview of a system arranged to carry out a method according to one embodiment of the present invention.

A schematic overview of apparatus for use in carrying out an embodiment of the present invention is shown in FIG. 1.

The apparatus comprises a number of satellites 100 which are broadcasting signals and a receiver 102, capable of receiving the broadcast signals. In this example, the receiver 102 is a field unit, or portable user receiver. The receiver 102 communicates via a communications network 104 with a central server 106. The server 106 also communicates with a security module 108, which provides a source of secure information.

Although a single server 106 and a separate security module 108 are shown, the functions could be shared between more or fewer physical entities. Of course, in a practical system, there will likely be many receivers 102 in operation at any time.

As described in the examples herein, the communications network 104 is a wireless network, e.g. 2G/3G/4G cellular, WMAN, WLAN, WPAN, RF, satellite communications, or the like. However, the communications channel can alternatively be on-line wired (e.g. PSTN, LAN, USB, etc.) or off-line (e.g. using a portable storage device or other data storage media), or the like.

The secure information stored within the security module 108 includes cryptographic materials that are used to generate the local replicas of the encrypted GNSS signals for correlation with the received RF signal samples.

Figure 2:
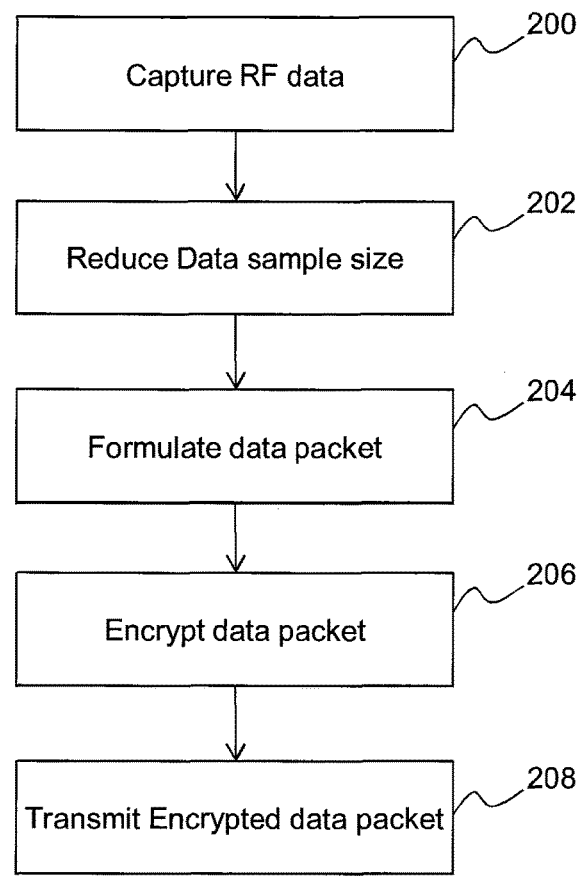
FIG. 2 shows a flow chart setting out the steps carried out by a receiver according to one embodiment of the present invention.

A process according to one embodiment of the invention is set out in summary in FIG. 2. In the embodiment of FIG. 2, the receiver 102 is used to capture the RF GNSS signal samples from the satellite (step 200), which includes Open GNSS signals service and Encrypted GNSS signals.

The receiver 102 includes some reduced-load processing which is used to decrease the size of the data message required for communication to the server 106 and to check the signal quality (step 202). This step is described in greater detail with relation to FIG. 3 below. The receiver 102 assembles a data packet composed of processed RF signal samples (and may include pre-processed open signal observations and/or diagnostics, such as an analysis of noise/interference levels, Doppler information, etc.) (step 204).

In this example, the data packet is then encrypted (step 206), although this need not be the case in all embodiments. The encrypted data packet is then sent to the central server 106 via the communications network 104 (step 208).

In a particularly preferred example, the time at which the signal is captured may be varied (i.e. may not follow a set pattern), and may for example be determined by a pseudo-random number generator based on a seed shared by the server). This means that an attempt to spoof the receiver 102 (i.e. to pretend to the server to be a particular receiver, for example so as to mislead the server as to the true position of the receiver), may be thwarted if it is determined that a signal has been gathered at the 'wrong' time. In another example, at least the time of data capture may be encrypted such that, if the data packet is taken 'out of the air' and replaced with a new data packet (perhaps again to provide misleading information as to the location of the receiver), it will be hard to provide a signal which closely matches the signal actually received by the receiver 102, which may therefore be readily identified as false. Of course, if the data packet is encrypted in any event, this could protect the timing data.

The server 106 will then process the data packet with assistance from the security module 108, as further described below.

Figure 3A:
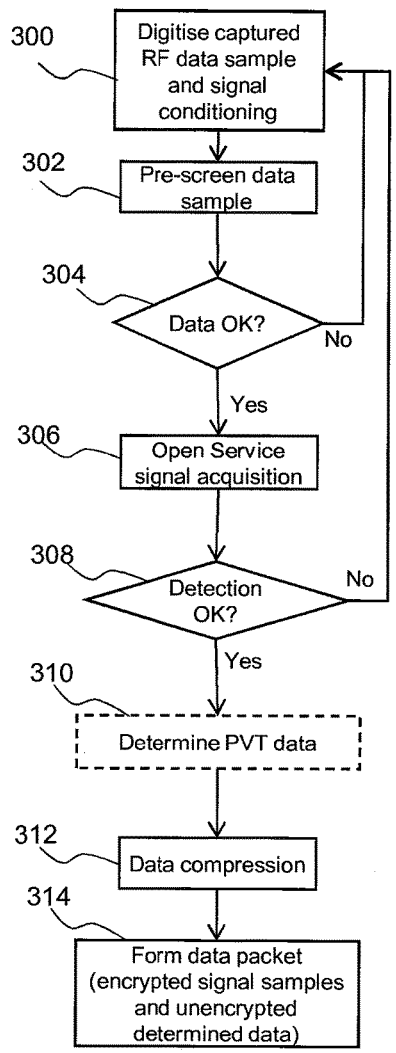
FIGS. 3A and 3B shows detail in relation to some of the steps in FIG. 2 according to embodiments of the present invention.
Figure 3B:
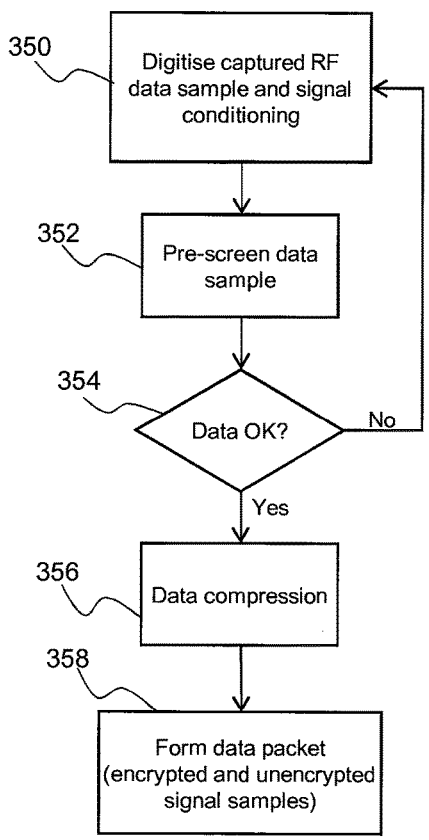

Two possible signal processing operations performed at the receiver 102 in steps 202 and 204 of FIG. 2 are now described in greater detail in relation to FIGS. 3A and 3B. In FIG. 3B, processing at the receiver 102 is relatively minimal. In FIG. 3A, by contrast, the receiver 102 performs its own processing of the open service signal and can calculate its own position (for example for display to a user).

In a possible 'intermediate' embodiment, the receiver 102 may perform open service correlations which are used to aid in data reduction steps, but may not go on to calculate its own position, which requires the addition of navigational data. As the skilled person will be aware, if the receiver 102 is a closed loop receiver, carrying out the next step of calculating position is trivial, but in a snapshot receiver an external source of navigation data would be required.

In both methods, having captured the signal, a Radio Frequency front-end processor digitises the signal and performs signal conditioning on the unencrypted and encrypted GNSS signals (step 300, 350).

Again in both methods, in steps 302 and 352 (which are optional), pre-screening of the signal captures is carried out to check the signal quality and/or for presence of high levels of RF interference, unwanted or counterfeit signals. Some of the pre-screening operations may include statistical analysis of the automatic gain control operation (AGC), the analogue-to-digital conversion levels, the captured signals spectrum, the signal auto-correlation properties or multi-antenna spatial filtering and spatial signal analysis. Additional screening of the data captured may be performed on the outcome of the open signal detection process, for example based on the detected signal strength levels and successful acquisition criteria.

One purpose of the pre-screening step is to provide an input for use in determining the amount of signal that is required to be captured to process of the encrypted signals. Of course, the actual amount of data will vary according to factors such as how many errors can be tolerated. However, the tests may be threshold tests on the results of the pre-screening operations mentioned above, or combined consideration of these and other variable(s). On the outcome of the pre-screening, an action may be performed as required (step 304, 354, which is also optional). In this example, if the signal(s) fail to meet the standards required by pre-screening, the step taken is to recapture a signal and start the process again, but in other examples, this could result, alternatively or additionally, in one or more of the following: a flag being raised, adapting the capture parameters (e.g. capturing a longer signal portion), employ anti-interference techniques (e.g. changing conversion levers or altering characteristics of the RF front end processes, for example by changing the AGC gain or the like) or aborting capture.

In FIG. 3A, the next step 306 is to determine information from the unencrypted signal (or carry out signal 'acquisition' for each satellite signal received (i.e. for each satellite in view). As will be familiar to the skilled person, in the context of GNSS, 'acquisition' means the process of comparing a received signal with a locally sourced or generated replica of a satellite signal to find a match. The aim of this is to identify the arrival time of a satellite signal matching the Pseudo Random Number (PRN) sequence for a given Space Vehicle (SV) number with respect to the receiver time. At its most basic, acquisition requires correlation between the received signal and candidate signals. Where the correlation exceeds a threshold, a match is declared.

In some embodiments, the acquisition operation may comprise, for example, one or more of frequency and phase shifting of the captured samples and correlation with a local reference waveform for each signal being searched, e.g. for each expected satellite in view. The test statistic output of these acquisition operations is compared against a detection threshold. If the test statistic exceeds the detection threshold, the detection measurements are recorded including for example some, or all, of satellite PRN, satellite code phase, frequency offset (also known as the Doppler frequency, including the satellite Doppler effect, clock and receiver motion effects) and correlation carrier-to-noise density ratio. If it is determined, in step 308, that not enough satellites are detected, a new data capture may take place for a different or extended capture time or the measurement may be cancelled. A new extended capture could also be triggered if enough satellites are detected, but they have low carrier-to-noise density ratio values.

In step 310, which is optional, PVT data is actually derived and may be displayed to a user. This may be a consolidated measurement based on the total SVs detected (i.e., pseudoranges or another similar measurement), or may be determined in any manner familiar to the skilled person.

The unencrypted signal code phase gives an ambiguous measurement of the satellite signal reception time. Since the unencrypted and encrypted GNSS signals are synchronized, these measurements can be used to reduce the length of the sampled data that needs to be transferred to the server 108 for detection of the encrypted signal as it will significantly reduce any search required.

In FIG. 3A, step 312 and FIG. 3B, step 356, data compression is performed.

The aim is to ensure that the captured data contains at least the minimum amount of data to ensure successful processing of the encrypted navigation signals, but preferably little or no data in addition. This process is based on a combination of bandwidth reduction and signal pre-screening techniques. Bandwidth reduction techniques may include down-conversion and filtering of analogue or digital signals into separate open and encrypted streams for processing and reduction of the data sample, and may be based on dumb or intelligent pre-filtering of the signal. For Binary Offset Carrier (BOC) or similar modulations used in GNSS or other navigation signals, the preserved signals may include a subsection of the full signal band including one or more than one spectral lobes offering different trade-offs between receiver performance, data transfer volumes, receiver complexity and energy consumption. A further extension could involve separating the open signals and encrypted signals. The two samples could be subsequently translated, re-sampled and summed together prior to performing other sample reduction processing. This process will increase in signal noise but both open and encrypted signals would be present in the same sample which could be extracted and recovered during correlation process.

Within the overall aim to reduce (and ideally minimise, or reduce as far as is practical and desirable in the circumstance) the volume of digitised data that is to be communicated to the server 106, different trade-offs of data compression versus sensitivity would be suitable depending on the application requirements, this includes consideration of bandwidth, quantisation levels limitation, overlaying spectrum, and the like.

The processed RF encrypted data, open signal observations (FIG. 3A) or processed RF unencrypted data (FIG. 3B) and, optionally, pre-screening measurement results will be inserted into a message as outlined in relation to step 204 of FIG. 2 (steps 314, 358). This message may optionally be encoded and/or encrypted to avoid transmission errors, eavesdropping, interception and/or ensure authenticity to the receiving server. Finally, the message will be transmitted to the server 106 through a wired, wireless or other communication/transfer medium as a data packet.

Figure 4:
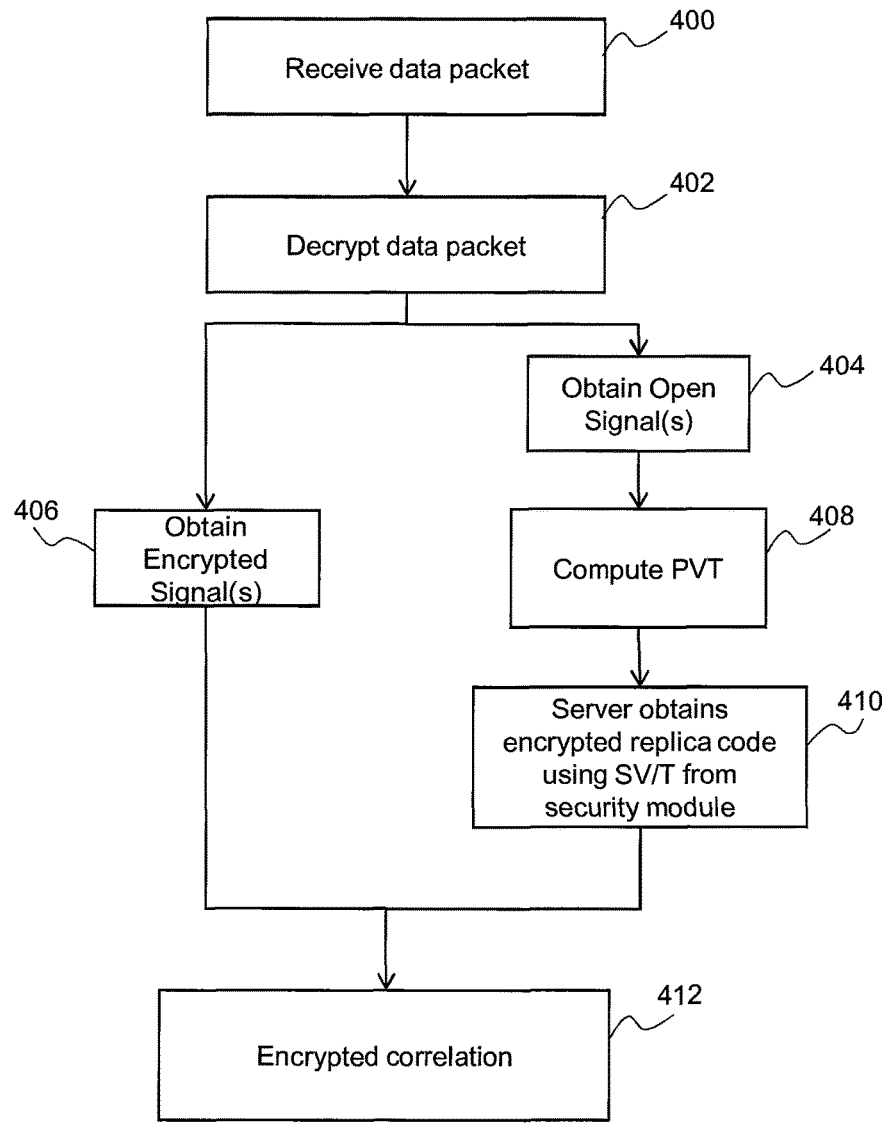
FIG. 4 shows a flow chart setting out the steps carried out by a remote processing device according to one embodiment of the present invention.

An example of server processing steps carried out for the open GNSS signal authentication is now described in FIG. 4.

To start, in step 400, the data packet is received at the server 106 where (if encrypted) it is decrypted in step 402. The secure satellite signal (which is still protected by the encryption with which it was sent from the satellite) is obtained from the unencrypted data packet (step 406) along with the Open signal (step 404), but they are processed differently as set out below.

In step 408, a PVT calculation is performed on the open GNSS signal observations with navigation data (in this example, it is assumed that such data was not supplied with the data packet sent from the receiver: if it is, this step need not be carried out at the receiver 106). Navigation data can be accessed directly by the processing function either from its own use of off-the-air GNSS signals or by accessing a service that provides it and other assistance data may be used to aid the PVT calculation. If all the signals can be trusted, the PVT will provide un-ambiguous observations as well as receiver position and time. However, at this point these data are not 'authenticated' through consideration of the encrypted signal portion, as set out below.

It should be noted that the calculation described above in relation to step 408 is not the only way of achieving the purpose of removing ambiguities in the observations: for example, previous measurements or coarse measurements from other sources (e.g. which cell of a communications network the receiver is in by reference to the identity of a communications tower or the like) may alternatively be used to remove ambiguities in the observations. However, a determination of satellite identity (SV) and Time (T) for the obtained signal(s) can be obtained from the decoded signals and this can be used to select the replica code in step 410.

To authenticate the open GNSS signal observations, the server 106 will perform an acquisition of the encrypted GNSS signals (step 412). As will be appreciated by the skilled person, acquisition of the open signal is relatively simple, typically being performed in seconds. Acquisition of an Encrypted signal (e.g., in Galileo, the PRS signal) is more complex and time consuming. However, by using the methods herein, and making use of the SV and time (T) data acquired from the Open signal, the task of acquiring the PRS signal is made much easier and less time/resource consuming. In this example, therefore, the SV and T or other information acquired from the open signal is used to narrow down the replica signals which the captured encrypted signal is compared against. The transmission time of an open service signal can be used to align the replica of the encrypted signal on the same satellite. Alternatively, the transmission times can be derived from an open service PVT solution. This enables authentication using satellites that do not have associated open service observations, for example un-observed ones, or satellites from other systems.

In order to perform the authentication, the resulting encrypted GNSS observation(s) are checked to ensure that they are consistent with the Open GNSS signal observations received. To this end, the server 108 uses the local replicas for encrypted signal(s) which are retrieved from the security module 108 in step 410. The time and length of the local replica is, in this example, determined by the satellite transmit time, the data capture length and residual uncertainties to ensure accurate identification of the signal. This acquisition process will therefore perform a 'matching' or correlation of the encrypted GNSS component of the RF captured signal with a local replica (step 412).

Authentication can occur in one of several ways. For example, if an encrypted GNSS signal is detected in the matching process above, then the open, unencrypted GNSS signal observation associated with that encrypted signal may be considered authenticated, since the encrypted GNSS signals are difficult to reproduce by an attacker (e.g., under a spoofing attack).

However, the skilled person will also be aware that, in general, if four or more encrypted GNSS signals are matched with replicas, then they can be used directly to generate a new PVT solution which is derived only from the encrypted signals (although other inputs, such as the PVT computed from the unencrypted signals, may also be used to reduce the computational load). This is therefore not a process to authenticate the previously generated PVT solution, as derived from the open GNSS signal, but instead has made use of the PVT solution to constrain the potential candidate replica signals used in correlation to produce a new PVT solution based only on the encrypted signal data.

In a further example, if one or more encrypted GNSS signals are detected in the matching process, these may be used to authenticate the PVT computed from the unencrypted signals by demonstrating that the time of flight of the encrypted signal is consistent with the calculated distance between the satellite (whose position is known from ephemeris and almanac information) to the position of the receiving device 102 as given by the PVT solution computed from the unencrypted signals. In such examples, (e.g. in which fewer than four encrypted signals are available), the PVT solution will be considered only partially authenticated since there will be a residual uncertainty in the authenticity of the PVT.

Figures 5A, 5B:
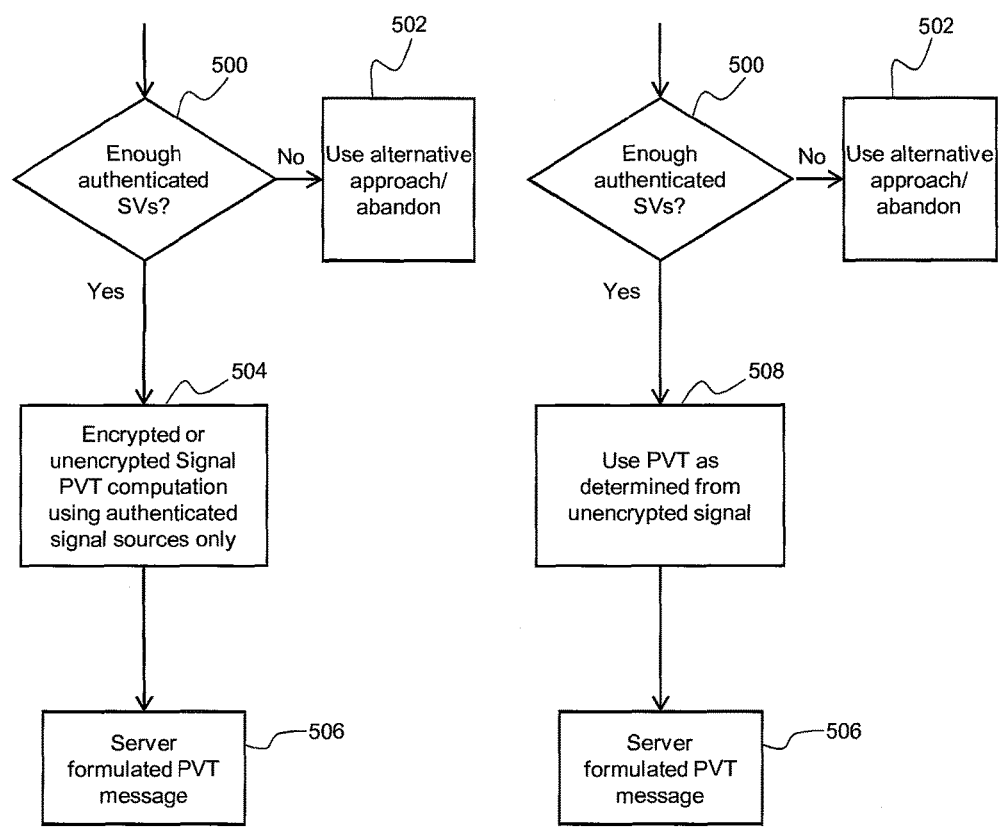
FIGS. 5A and 5B shows further steps carried out by a remote processing device and/or a security module according to embodiments of the present invention.

The process may therefore continue according to one of the example alternative processes set out in FIGS. 5A and 5B.

In this example, an attempt is made to correlate all of the encrypted signals received and it is considered, in step 500 of both FIGS. 5A and 5B, whether a sufficient proportion of the open signals have been authenticated. The actual number or proportion determined as sufficient will vary depending on the circumstance, and could therefore range from a single matching encrypted signal to requiring that all the encrypted signals are matched with replicas. In both FIGS. 5A and 5B, if the threshold is not met, either an alternative approach is to be used or the process may be abandoned and, for example, a new data packet would be requested or awaited (step 502). More detail on this is provided below.

Assuming however that the threshold is met (and in practical terms with reference to the method of FIG. 5A, this requires at least 4 matched signal), in a first example described in relation to FIG. 5A, a new PVT calculation will be performed using only the trusted (i.e. authenticated) signals and/or the matched encrypted signals (step 504). This calculation will use and depend only on the encrypted GNSS signal observations, but may be aided for efficiency by the PVT computed from the unencrypted signals in step 408 or other measurements which contain information on the location, time and/or velocity of the receiving devices. Different performances may be obtained from the Open or encrypted GNSS signals in terms of sensitivity, accuracy, resistance to multipath, interference robustness, etc.

The result of this calculation can then be used to formulate a PVT message (step 506), which can be used for tracking to location of the receiver 102, or may be sent back to the receiver 102, or logged or used for some other purpose.

In the example of FIG. 5B, so long as the threshold of 'matched' signals is met in step 500, then, in step 508, the previously determined PVT figure (i.e. as determined in step 408) could be used to form the basis of the server formulated PVT message, for use as described in relation to FIG. 5A. This threshold should be set according to the confidence level required in the result.

In each case, the server formulated message may provide an indication of the level of authentication achieve (e.g. whether all the signals were authenticated, only authenticated signals were used, or there has been partial authentication, in which case a confidence level could be provided). The method of FIG. 5B may therefore result in a message where the confidence is relatively low.

As noted above, where there are no, or insufficient, trusted open GNSS signals (i.e., in step 500, too many correlations fails), or they are temporarily denied, then, in step 502, an alternative method may be used or the process may be abandoned. In one alternative method, the position and/or time of the receiver 102 may be coarsely determined from another source (e.g. an alternative positioning system, a radio communications network) and/or through propagation of previous timing and position information (which could include consideration of known or expected user dynamics). In such examples 'old' source identity/signal transmission time data may be used, for example in addition to further considerations to determine samples for comparison with a 'new' encrypted signal, or vice versa. In particular, the use of new, established or adapted network protocols (e.g. time broadcast, multi-trip NTP etc) could be used to establish high accuracy time at the user terminal. Timing or positioning information may also be obtainable through capture and processing of so-called "signals of opportunity" which would contain such information. This information is subsequently used to aid an acquisition of the encrypted GNSS signals which are in turn used to compute PVT.

In an enhancement to the proposed approach, additional navigation (or other) sensors could be deployed on-board the user receiver 102. In such an instance, such sensors would grab measurements at the same time as the open and encrypted GNSS signals are sampled. E.g. Doppler information from a (or the communication) network, antenna direction, interference levels, etc. The sensor data would be included in the message and transmitted to the server 106.

The server 106 could process the GNSS signal data in a separate process to any such sensor data. The GNSS observations could be integrated with the sensor measurements in a filter to determine a composite (or hybridised) position or alternatively to provide aiding for a series of measurements. Furthermore, measurements from other sensors could be used to narrow the search space of the receiver as they provide "steering" for how the user has moved. This information can be used as an external input within the GNSS signal processing to constrain the solution.

As described above, the method includes the use of encrypted GNSS signals to support authentication of open GNSS signals, and also provides for positioning using encrypted GNSS signals without the need for security information to be held or used within the user device.

This method could be used for any or all encrypted GNSS signals from any or all GNSS systems and augmentations. This includes secure military, governmental, commercial and regulated services.

The apparatus mentioned above is now described in greater detail with reference to FIGS. 6-8.

Figure 6:
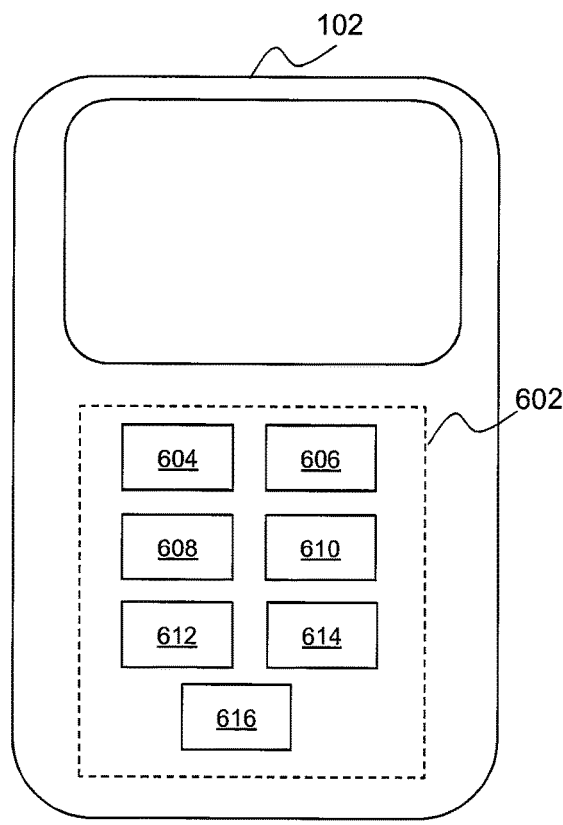
FIG. 6 shows a schematic exemplary layout for a receiver.

FIG. 6 shows a receiver 102 according to one embodiment of the invention. The receiver 102 comprises processing circuitry 602, the processing circuitry comprising: an analogue to digital converter 604, which converts the RF signal to a digital signal; a screening module 606, which carries out pre-screening as set out above; a compression module 608 arranged to compress the data as set out above, a communication module 610, arranged to allow communication with the remote server 106; a number of sensors 612, arranged to gather additional information, such as navigational information (for example this information may include speed of movement, direction of travel, altitude, location information relating to the cellular telephone network, and the like); and an encryption module 614, arranged to encrypt data before it is sent to the server 106.

Of course, as set out above, the receiver 102 may comprise alternative, additional or fewer components. In particular, the receiver may comprise a comparison module arranged to identify the unencrypted signal (e.g. in performing acquisition).

Figure 7:
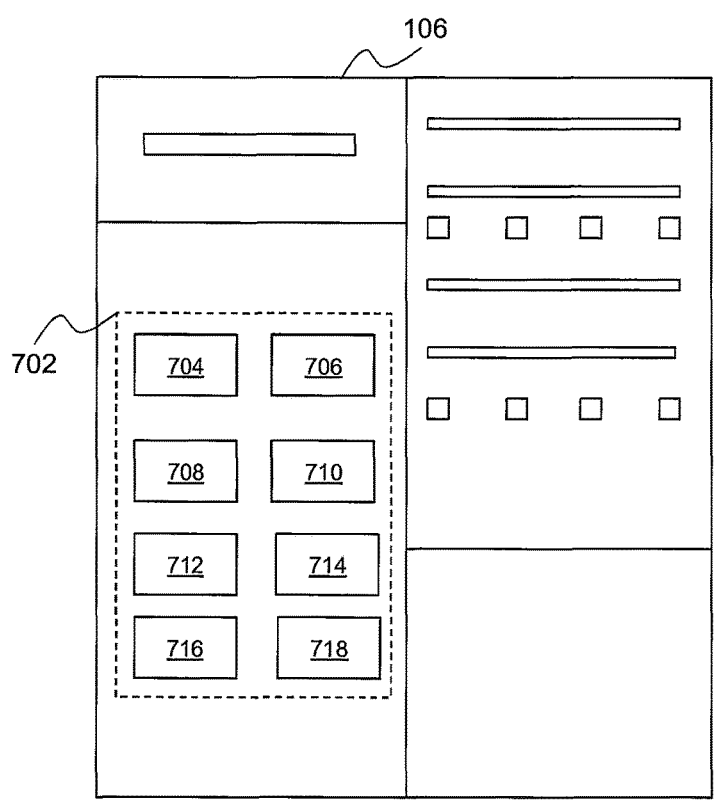
FIG. 7 shows a schematic exemplary layout for a remote processor.

FIG. 7 shows a server 106 according to one embodiment of the invention which provides a remote processing device. The server 106 comprises processing circuitry 702, the processing circuitry comprising: a decryption module 704, which decrypts the encrypted data packet received from the receiver 102; a reference signal generator 706, which provides reference signals for comparison; a comparison module 708 which carries out the comparison, a communication module 710, arranged to allow communication with the receiver 102, and a security module interface 712 arranged to allow communication with the security module 108; and an authentication module 714, arranged to authenticate the unencrypted signals based on the result of the encrypted signal comparisons; a data content module 716, arranged to determine the information carried in the signals (in a GNSS system, this therefore functions as the navigation module as it will determine PVT information) and a software application module 718, arranged to receive and utilise PVT information.

Figure 8:
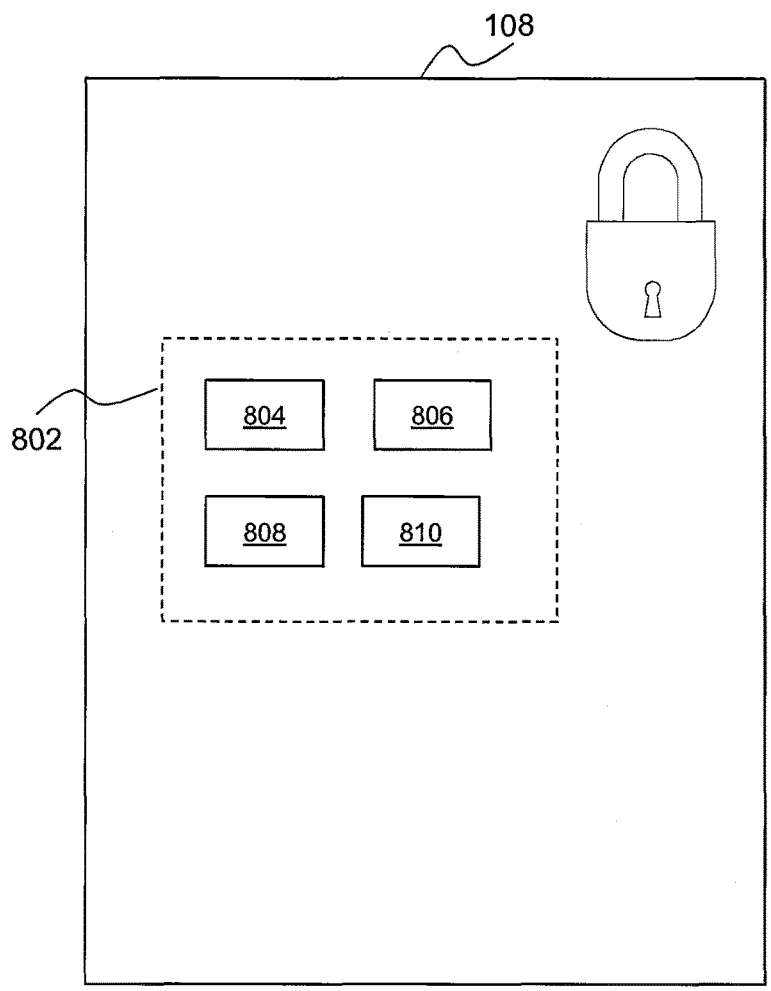
FIG. 8 shows a schematic exemplary layout for a security module.

FIG. 8 shows a security module 108 according to one embodiment of the invention. The security module 108 comprises processing circuitry 802 comprising: a reference signal generator 804, which is to provide reference signals for comparison; a comparison module 806, capable of carrying out a comparison or encrypted data samples, a communication module 808, arranged to allow communication with the remote server 106; and data content 810, arranged to read the content of the encrypted signals.

Of course, the physical arrangement of these modules, in particular between the security module 108 and the server 106, could be different. The security module 108 could physically comprise part of the server 106, albeit preferably securely partitioned therefrom. It will also be noted that in the description above, both the server 106 and the security module 108 comprise comparison modules: this need not be the case and both comparisons could be carried out on one device or the other, or the unencrypted signal portion could undergo comparison (e.g. as part of acquisition) the receiver 102.

While the methods set out above have been discussed in relation to GNSS, the same techniques are applicable to terrestrial navigation and location systems (e.g. pseudolites, radio-navigation, radio-positioning systems and use of signals of opportunity for positioning), and could be adapted thereto by the skilled person.

Any range or device value given herein may be extended or altered without losing the effect sought, as will be apparent to the skilled person for an understanding of the teachings herein.

The invention claimed is:

1. A method of processing signal data comprising an unencrypted portion and an encrypted portion, the method comprising:
   (i) receiving, at a receiver, the signal data;
   (ii) processing a sample of the signal data to provide a processed signal sample comprising data relating to the encrypted portion of the signal data and data relating to the unencrypted portion of the signal data,
   (iii) comparing the unencrypted signal data with at least one reference signal to determine information comprising at least one of (i) the time at which the signal was sent from the source and (ii) the identity of the source;
   (iv) requesting, based on the determined information, and from a source remote to the receiver, a set of encrypted reference signal samples;
   (v) comparing, on a processing device remote to the receiver, the set of encrypted reference signal samples with the received encrypted signal data to identify any matching signal samples.

2. A method according to claim 1 which is a method of authenticating a source of the signal data and/or content of the signal data, and the signal data source and/or content is authenticated in the event of a match between at least one of the set of encrypted reference signal samples and the received encrypted signal data sample being determined.

3. A method according to claim 1 which is a method of identifying an encrypted data signal, and the method optionally further comprises deriving data based on the identification of matching encrypted signal samples to determine information encoded in the encrypted signal data.

4. A method according to claim 1 which is carried out by at least three entities: a receiver, a remote processing device, and a security module.

5. A method according to claim 4 in which steps (i) and (ii) are carried out by the receiver, and the processed signal sample is then transmitted to the remote processing device for further processing.

6. A method according to claim 5 in which step (iii) is performed by the receiver, and the determined information is, or forms part of, the data relating to the unencrypted signal data which in turn form parts of the processed signal sample.

7. A method according to claim 4 in which the remote processing device uses the received information to request a set of encrypted reference signals from the security module, and/or the security module receives at least the part of the processed signal sample which relates to the encrypted portion of data, and performs step (v).

8. A method according to claim 4 in which the set of encrypted reference signals generated are transmitted from the security module to the remote processing device, which performs step (v).

9. A method according to claim 1 in which the step of processing the signal sample is arranged to reduce the signal sample size prior to transmitting the signal sample.

10. A method according to claim 1 in which the step of processing the signal sample comprises separating the unencrypted and encrypted signals into two streams for processing.

11. A method according to claim 1 which comprises pre-screening the signal received prior to transmission to the remote processing device.

12. A method according to claim 11 in which, if the pre-screening indicates that the captured signal does not meet predetermined standards, the method further comprises one or more of: (i) restarting the method by recapturing a signal, (ii) a user notification being generated, (iii) adapting the capture parameters, (iv) employing anti-interference techniques or (v) aborting signal capture.

13. A method according to claim 11 in which the pre-screening is used to determine the amount of signal that is required to be captured and/or an amount of data compression that may be performed.

14. Apparatus for processing signal data comprising an unencrypted portion and an encrypted portion, the apparatus comprising at least one of each of the following: a receiver, a remote processing device and a security module, wherein:
(i) the security module comprises a reference signal generator arranged to generate a set of encrypted reference signal samples;
(ii) the receiver is arranged to receive signal data and comprises processing circuitry arranged to process signal data to provide a processed signal sample comprising data relating to the encrypted portion of the signal data and data relating to the unencrypted portion of the signal data, and further comprises a transmitter for transmitting the processed signal sample to the remote processing device
(iii) at least one of the remote processing device and the receiver comprises processing circuitry comprising a comparison module for comparing the signal data with reference signal samples, and arranged to compare received unencrypted signal data with at least one reference signal to determine information comprising at least at least one of (i) the time at which signal data was sent from the source and (ii) the identity of a signal data source;
(iv) the remote processing device comprises communication apparatus arranged to request generation of encrypted reference signal samples;
(v) the reference signal generator of the security module generates, based on the request, a set of encrypted reference signal samples;
(vi) at least one of the security module and the remote processing device comprises a comparison module arranged to compare the set of encrypted reference signal samples with the received encrypted signal data to identify any matching signal samples.

15. Apparatus according to claim 14 which is arranged to authenticate a source of the signal data and/or content thereof, and the signal data source is authenticated in the event of a match between the set of encrypted reference signal samples and the received encrypted signal sample.

16. Apparatus according to claim 15 in which the remote processing device comprises an authentication module, arranged to authenticate information output from the comparison module in relation to an unencrypted signal based on the determination that a related encrypted signal portion matches a reference sample.

17. Apparatus according to claim 14 which is arranged to identify an encrypted data signal, and the apparatus is arranged to derive data based on the identification of matching encrypted signal samples to determine information encoded in the encrypted data signal.

18. Apparatus according to claim 14 which is part of a Global Navigation Satellite System (GNSS), and the receiver is a GNSS receiver.

19. Apparatus as claimed in claim 14, wherein the processing circuitry of part (ii) is arranged to compress the processed signal relative to the received signal size, before the processed signal is transmitted to the remote processing device.

20. Apparatus according to claim 19 which is arranged to capture a received signal for processing at a time determined by processing circuitry, and time at which the signal is captured is varied.

* * * * *